United States Patent

[11] 3,628,768

[72] Inventor Richard Stuart Hutt
 Adrian, Mich.
[21] Appl. No. 81,455
[22] Filed Oct. 16, 1970
[45] Patented Dec. 21, 1971
[73] Assignee Primore Sales, Inc.
 Adrian, Mich.

[54] QUICK CONNECTING COUPLING
 13 Claims, 7 Drawing Figs.
[52] U.S. Cl. .................................. 251/148,
 285/305
[51] Int. Cl. ........................................ F16l 37/28
[50] Field of Search ............................ 251/148;
 62/299; 285/305, 308, 321, 276

[56] References Cited
 UNITED STATES PATENTS
 1,369,687 2/1921 Martin .................... 285/321 X
 3,198,480 8/1965 Morse .................... 251/148
 3,314,696 4/1967 Ferguson et al. .............. 285/305 X Primary Examiner—William R. Cline
Attorney—Barnes, Kisselle, Raisch & Choate ABSTRACT: A quick connecting coupling comprising a first member having an opening therethrough providing a fluid passage. The first member has a noncircular recess at one end of said opening. A second member having a projection with a noncircular external configuration extends into the recess of the first member and sealing means are provided between the first member and said projection of the second member. The first member has spaced peripheral grooves a portion of which communicate with the opening therethrough. The second member has an annular peripheral groove therein aligned with the spaced peripheral grooves and a retaining ring having spaced legs is positioned in said spaced grooves of said first member and has portions thereof extending into said peripheral groove of the second member. The retaining ring has an encircling portion surrounding the projection and interposed between the first member and the second member. The retaining ring includes connecting portions extending from the ends of said encircling portion to the ends of the legs respectively.

PATENTED DEC 21 1971 3,628,768

INVENTOR
RICHARD S. HUTT
BY
Barnes, Kisselle, Raisch & Choate
ATTORNEYS

PATENTED DEC 21 1971

INVENTOR
RICHARD S. HUTT
BY
Barnes, Kisselle, Raisch & Choate
ATTORNEYS

QUICK CONNECTING COUPLING

This invention relates to couplings and particularly to couplings for attaching a refrigeration valve to a refrigeration unit or for coupling two tubing sections to one another.

BACKGROUND OF THE INVENTION

In coupling refrigeration valves and refrigeration units, it has been common to utilize threaded connectors such as shown in the U.S. Pat. Nos. to Morse, 3,091,945 and 3,198,480. Such a connector has proved satisfactory especially where it is desired to change the direction in which the tube attached to the valve extends with respect to the refrigeration unit.

However, connection by utilizing a threaded connection requires time and the use of tools.

Among the objects of the present invention are to provide a quick connecting coupling wherein the connection between a valve and a refrigeration unit or between two tubing sections can be achieved quickly; wherein axial rotation between the parts that are coupled is prevented; wherein the direction of a tubing with respect to the coupling can be adjusted and set during the making of the coupling; wherein the coupling is maintained in connected position and prevented from accidental disconnection without the use of a specific tool; wherein the coupling is achieved quickly without excessive labor; wherein the use of gaskets interposed between the members is obviated; which coupling avoids the use of machine surfaces to provide proper seal between the parts; and which can be readily made at low cost.

SUMMARY OF THE INVENTION

In accordance with the invention, the quick connecting coupling comprising a first member has an opening therethrough providing a fluid passage. The first member has a noncircular recess at one end of said opening. A second member having a projection with a noncircular external configuration extends into the recess of the first member and sealing means are provided between the first member and said projection of the second member. The first member has spaced peripheral grooves a portion of which communicate with the opening therethrough. The second member has an annular peripheral groove therein aligned with the spaced peripheral grooves and a retaining ring having spaced legs is positioned in said spaced grooves of said first member and has portions thereof extending into said peripheral groove of the second member. The retaining ring has an encircling portion surrounding the projection and interposed between the first member and the second member. The retaining ring includes connecting portions extending from the ends of said encircling portion to the ends of the legs respectively.

DESCRIPTION

Figure 1:
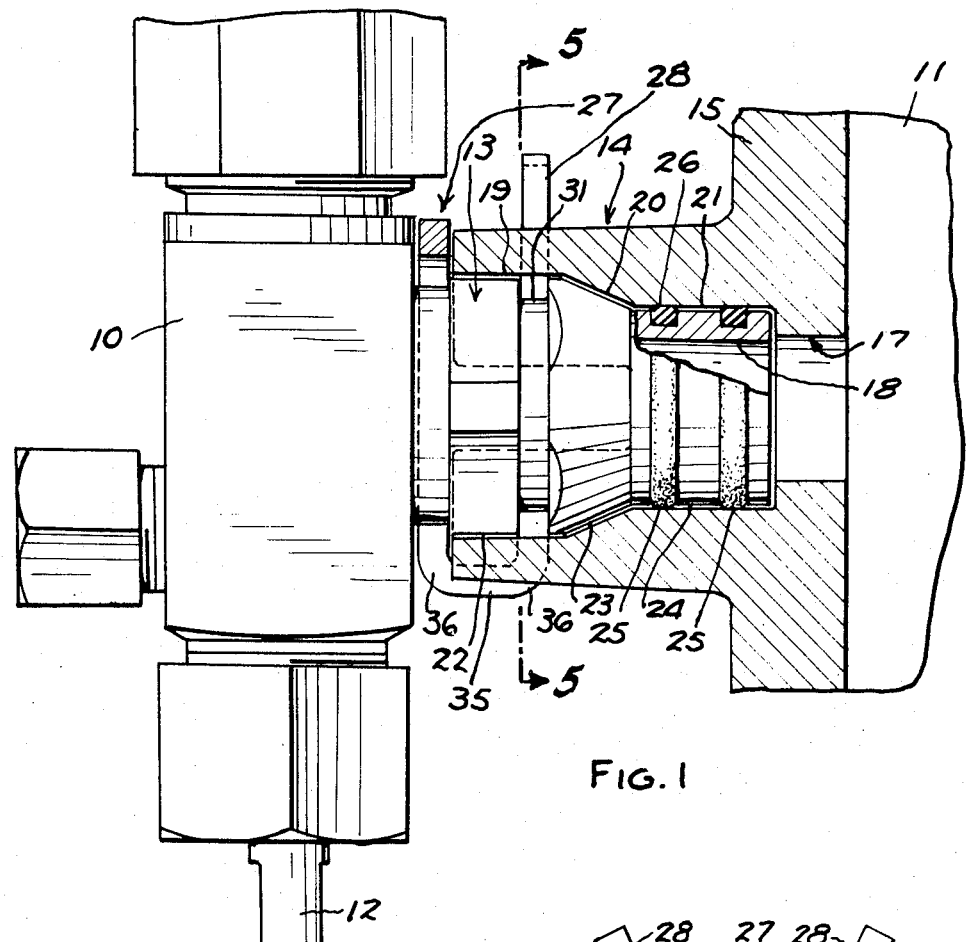
FIG. 1 is a part sectional view of a quick connecting coupling embodying the invention.
Figure 2:
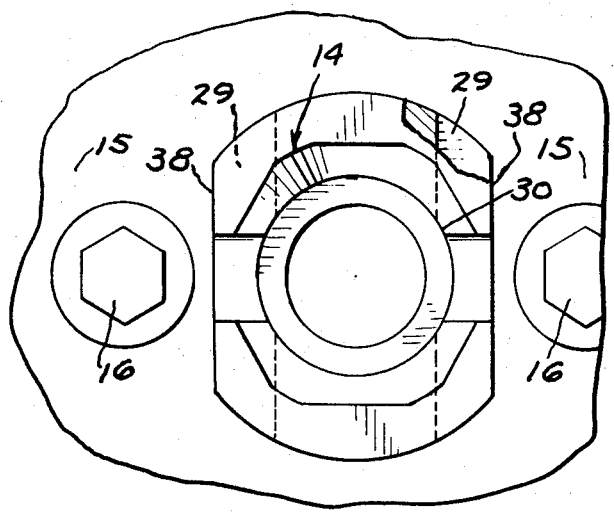
FIG. 2 is an end view of a portion of one of the parts shown in FIG. 1.

Referring to FIG. 1, the quick connecting coupling embodying the invention is shown in the connecting of refrigeration valve 10 and a refrigeration unit 11. Refrigeration valve 10 is of the safety shutoff type and includes an axially movable member 12 that is rotated to move it axially to open and close fluid communication. The valve 10 includes a projection 13 that is adapted to be coupled to a member or spud 14. Spud 14 is shown as being part of cylinder head 15 and is mounted on the refrigeration unit by bolts 16 (FIG. 2).

The member 14 includes an opening 17 that extends therethrough and provides for communication of fluid such as refrigerant. Similarly, the projection 13 includes an opening 18 which is aligned with the opening 17.

The opening 17 includes a first noncircular portion 19 adjacent its free end, herein shown as hexagonal, an inwardly tapered frustoconical portion 20 and a slightly inwardly tapered generally cylindrical portion 21. The projection 13 includes generally complementary external portions including a noncircular portion 22, an inwardly tapered portion 23 and a cylindrical portion 24.

A seal is provided between the projection 13 and the member 14 by rubber O-rings 25 that are provided in grooves 26 in the periphery of the cylindrical portion 24 of projection 13 and engage the surface portion 21.

Figure 3:
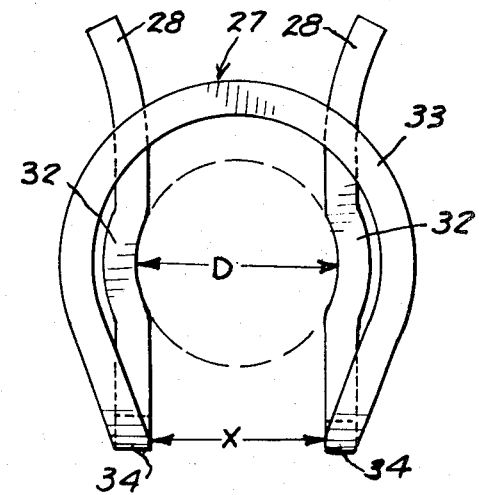
FIG. 3 is an end view of another part shown in FIG. 1.

A retaining ring 27 of metal spring material is provided and has spaced legs 28 that extend into opposed grooves 29 in the periphery of the member 14. The grooves 29 communicate with the surface 19 as at 30. The projection 13 includes a cylindrical groove 31 having a cylindrical base and sidewalls at a right angle to the base. Intermediate arcuate portions 32 of legs 28 extend into and engage the groove 31. When the retaining ring 27 is in the untensioned condition as shown in FIG. 3, the distance D between the inner surfaces of the portions 32 of the legs is slightly less than the diameter of the base of the groove 31.

The retaining ring 27 includes an encircling portion 33 that encircles the projection 13 and has ends 34 which are spaced from one another a distance X, that is less than the diameter of the groove 31. The ends 34 of the encircling portion 33 are connected by intermediate portions 35 to the ends 36 of the legs 28. The free ends of the legs 28 flair outwardly as shown in FIG. 3.

In use, the retaining ring 27 is initially placed on the spud or member 14 with the legs 28 engaging the grooves 29, and the encircling portion 33 overlying the end of the member 14.

When it is desired to make the connection, the projection 13 is merely moved axially into the opening 17. The tapered surface 23 engages the intermediate portions 32 forcing them outwardly until the groove 31 is aligned with the legs 28 whereupon the legs 28 snap inwardly under the action of the spring force of the material into the grooves to lock the projection in position.

Figure 4:
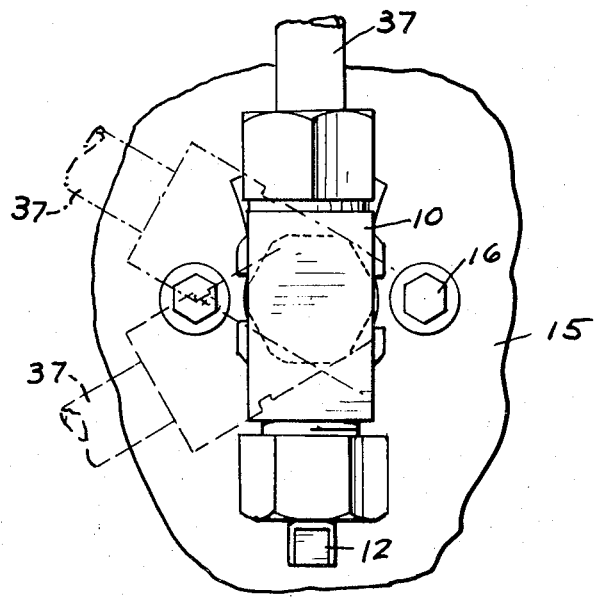
FIG. 4 is an end view of the coupling shown in FIG. 1.
Figure 5:
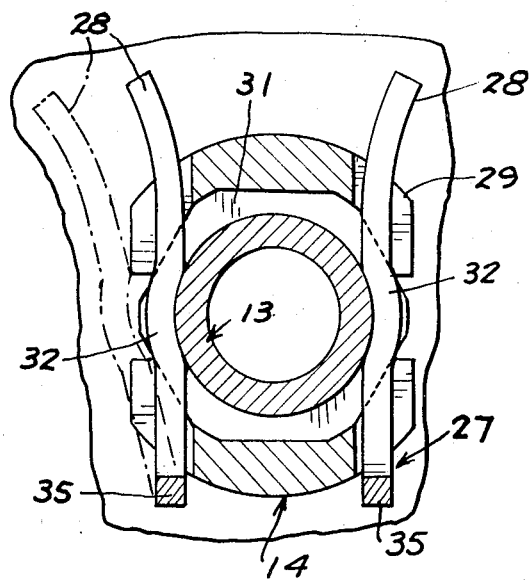
FIG. 5 is a fragmentary sectional view taken along the line 5—5 in FIG. 1.

As shown in FIG. 4 in broken lines, since the portion 19 of meter 14 and the portion 22 of projection 13 are hexagonal, it is possible to selectively position the valve 10 so that it extends axially at a different angle to the opening 17 as may be required in order to direct the tubing 37 in the desired direction.

When in position, the encircling portion 33 holds the legs 28 and being interposed between the body 10 and the spud 14 prevents disconnecting the coupling except when a tool is used to spread the legs 28 apart.

Figure 6:
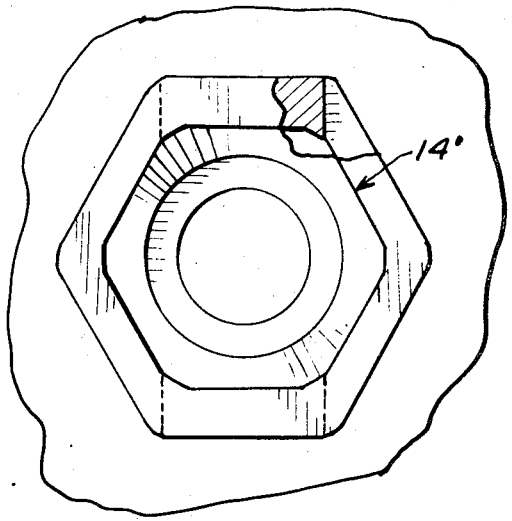
FIG. 6 is an end view of a modified form part.

As shown in FIG. 2, portions 38 of the projection or spud 14 are cut away in order to provide access to the bolts 16.

Where the projection or spud 14 is made an integral part of the unit, the sides need not be cut away as shown at 14' in FIG. 6.

Figure 7:
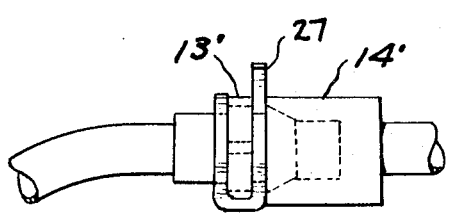
FIG. 7 is a side view of a modified form of coupling.

A similar coupling arrangement may be utilized for connecting portions of tubing by making the projection 13 so that it can be attached to a length of tubing and making the member 14 so that it can be attached to a length of tubing as shown in FIG. 7.

I claim:

1. In a quick connecting coupling, the combination comprising
   a first member having an opening therethrough providing a fluid passage,
   said first member having a noncircular recess at one end of said opening,
   a second member having a fluid passage therethrough,
   said second member having a projection with an external configuration, a portion of said external configuration having the noncircular cross section of said recess in said first member and being adapted to be engaged therein, sealing means between said opening and said projection of said second member, said first member having spaced peripheral grooves a portion of which communicate with the opening therethrough and are arranged transversely thereto, said second member having an annular peripheral groove therein adapted to be aligned with said spaced peripheral grooves when the members are engaged, a retaining ring having spaced legs positioned in said spaced grooves of said first member and having portions thereof extending into said peripheral groove of said second member, said retaining ring having an encircling portion surrounding the projection and interposed between the first member and the second member, said retaining ring including connecting portions extending from the ends of said encircling portion to the ends of the legs respectively.

2. The combination set forth in claim 1 wherein said projection includes a generally cylindrical end portion and an outwardly tapered portion extending to said noncircular portion.

3. The combination set forth in claim 2 wherein said sealing means comprises flexible sealing rings interposed between the cylindrical portion of said second member and a mating cylindrical portion of said first member.

4. The combination set forth in claim 1 wherein the noncircular recess and the noncircular portion are polygonal.

5. The combination set forth in claim 1 wherein said peripheral groove in said projection has a generally cylindrical base and sidewalls at generally right angles to said base.

6. The combination set forth in claim 1 wherein said portion of said legs which engages the peripheral groove are arcuate.

7. The combination set forth in claim 1 wherein said encircling portion of said retaining ring has spaced ends, the ends of said encircling portion being spaced from one another a distance less than the diameter of the base of the peripheral groove in said projection.

8. The combination set forth in claim 7 wherein said noncircular recess and noncircular portion of said projection are hexagonal.

9. The combination set forth in claim 1 wherein said first member is mounted on a refrigeration unit, said second member comprising a refrigeration valve including a valve body extending at an angle to said projection, said valve body having a fluid passage therein communicating with said opening in said projection and forming an angle therewith.

10. The combination set forth in claim 9 wherein said first member is removably mounted on said refrigeration unit.

11. The combination set forth in claim 10 including bolts for retaining said first member on said refrigeration unit, said first member having portions thereof cutaway to provide access to said bolts.

12. The combination set forth in claim 1 wherein said first and second member comprises coupling members adapted to be attached to tubes.

13. The combination set forth in claim 1 wherein said retaining ring is made of material having substantially rectangular cross section.

* * * * *